United States Patent
Lipcsei et al.

(10) Patent No.: US 7,446,516 B2
(45) Date of Patent: Nov. 4, 2008

(54) DC/DC CONVERTER WITH IMPROVED STABILITY

(75) Inventors: Laszlo Lipcsei, Campbell, CA (US);
Sorin Hornet, Milpitas, CA (US)

(73) Assignee: O2 Micro International Limited, Grand Cayman (KY)

( * ) Notice: Subject to any disclaimer, the term of this patent is extended or adjusted under 35 U.S.C. 154(b) by 5 days.

(21) Appl. No.: 11/502,904

(22) Filed: Aug. 11, 2006

(65) Prior Publication Data

US 2007/0040538 A1    Feb. 22, 2007

Related U.S. Application Data

(60) Provisional application No. 60/710,025, filed on Aug. 19, 2005.

(51) Int. Cl.
*G05F 1/575* (2006.01)
*G05F 1/565* (2006.01)

(52) U.S. Cl. .................................... 323/282

(58) Field of Classification Search ............... 323/224, 323/271, 282, 285
See application file for complete search history.

(56) References Cited

U.S. PATENT DOCUMENTS

| | | | |
|---|---|---|---|
| 5,982,160 A * | 11/1999 | Walters et al. | 323/282 |
| 6,147,478 A * | 11/2000 | Skelton et al. | 323/288 |
| 6,215,288 B1 | 4/2001 | Ramsey et al. | 323/224 |
| 6,879,136 B1 * | 4/2005 | Erisman et al. | 323/282 |
| 2007/0035281 A1 * | 2/2007 | Kuroiwa et al. | 323/222 |

FOREIGN PATENT DOCUMENTS

| | | |
|---|---|---|
| JP | 07274495 | 10/1995 |
| WO | WO2005/046036 | 5/2005 |

* cited by examiner

*Primary Examiner*—Gary L Laxton

(57) ABSTRACT

The DC/DC converter according to one embodiment includes a switch, an inductor, a capacitor, a resistor, and a voltage divider. The switch is coupled to the input voltage. The inductor is used for coupling the first switch to an output node of the DC/DC converter so as to generate the output voltage at the output node. The capacitor is coupled to the output voltage. The resistor is coupled to the capacitor in series, and is coupled to ground. The voltage divider is coupled across the capacitor so as to reduce the zero frequency of the DC/DC converter.

19 Claims, 2 Drawing Sheets

DC/DC CONVERTER WITH IMPROVED STABILITY

CROSS REFERENCE TO PROVISIONAL APPLICATION

This application claims priority to the now abandoned provisional patent application Ser. No. 60/710,025, entitled "DC/DC Converter With Improved Stability," with filing date Aug. 19, 2005, and assigned to the assignee of the present invention, which is herein incorporated by reference in its entirety.

TECHNICAL FIELD

The invention relates to a DC to DC converter, and more particularly, to a buck DC to DC converter.

BACKGROUND ART

Direct-current to direct current (DC/DC) converters are widely used in the field of electronics. Such circuitry or devices, which are typically employed to convert an input DC voltage into a predetermined stable DC voltage by switching-control of a semi-conductor device, are well known, and constitute a vital part in power supplies in various electronic apparatuses. For fast microprocessors and chipsets, a DC/DC controller needs to have fast responses in order to meet the load transient response requirements of the microprocessors and chipsets. However, the fast reaction might cause stability issues of the DC/DC converter for the electrical circuit. Conventional voltage mode and current mode controllers are very stable due to their external compensation networks, but fail to meet the load transient response specifications. In order to ensure stability and mitigate the load transient behavior, the switching frequency is pushed to higher frequencies and the ESR (Equivalent Series Resistance) of filtering capacitors should be high enough in order to assure enough phase margin. The stability of a DC/DC converter is essentially based on the ESR of the output decoupling capacitors. However, typical output ceramic decoupling capacitors cannot be used because of their low ESR, which will be described in details hereinafter.

Referring to PRIOR ART FIG. 1, a typical prior art DC/DC converter 100 is illustrated. The DC/DC converter 100 is used to convert an input voltage (Vin) to a predetermined output voltage on a load 120, and comprises two switches 102 and 104, an inductor 106, a capacitor 108, resistors 112 and 114, and a controller 116. The switch 102 is coupled to the input voltage of the DC/DC converter 100 and to the inductor 106. The switch 104 couples the switch 102 and the inductor 106 to ground. The switches 102 and 104 serve as a switching circuit for receiving and converting the input voltage to a predetermined output voltage.

The controller 116 is coupled to the switch 102 at a HDR pin and the switch 104 at a LDR pin to control the conductive states of switches 102 and 104 and further to control the output voltage of the DC/DC converter 100. It will be apparent to those skilled in the art that PWM signals will be delivered from the HDR pin and the LDR pin of the controller 116 so as to regulate the output voltage of the DC/DC converter 100 to the predetermined output voltage.

The two ends of the inductor 106 are coupled to the switch 102 and an output node of the DC/DC converter 100, respectively. The capacitor 108 is coupled to the output node of the DC/DC converter 100. The inductor 106 and the capacitor 108 form a low pass filter to smooth the output of the DC/DC converter 100. It will be apparent to those skilled in the art that the resistor 110 is an inherent parasitic resistance or an Equivalent Series Resistance (ESR) of the capacitor 108.

The resistors 112 and 114 serve as a voltage divider. The resistors 112 and 114 are coupled to each other in series for coupling the output node of the DC/DC converter 100 to ground so as to generate a divided voltage of the output voltage at the common node of the resistors 112 and 114. The divided voltage serves as a feedback signal of the output voltage, and is coupled to the voltage feedback pin (VFB) of the controller 116. The controller 116 controls the switch 102 and the switch 104 in response to the feedback signal at node VFB so as to precisely deliver the predetermined output voltage.

It will be apparent to those skilled in the art that the voltage ripple on the capacitor 108 is proportional to the current ripple of the inductor 106. The voltage on the capacitor 108 is divided by the resistors 112 and 114. The zero frequency or the frequency of the zero, Fz, introduced by the capacitor 108 can be calculated in Equation (1) as follows:

$$Fz = \frac{1}{2\pi * Cout * ESR} \quad (1)$$

Where Cout is the capacitance of capacitor 108 and ESR is the ESR value of the capacitor 108 or the resistance value of the resistor 110.

The stability condition in this case is to assure the zero frequency Fz introduced by the capacitor 108 combined with the ESR resistor 110 to be low enough so as to partially reduce or compensate the influence of the LC double pole, e.g. the inductor 106 and the capacitor 108. From the equation (1), it is understood that the resistor 110, i.e., the ESR of the capacitor 108, has to be high enough to ensure a low zero frequency Fz. However, the ESR value of a ceramic decoupling capacitor is relatively small. Thus, an inexpensive output ceramic decoupling capacitor may not be employed in the DC/DC converter 100.

Ceramic capacitors have high capacitance and low ESR, and are inexpensive. It is desirable to use ceramic capacitors. DC/DC converters that are unfit to use ceramic output capacitors for stability reasons may be bulkier and more expensive. Another disadvantage of the topology shown in PRIOR ART FIG. 1 is that the output voltage ripple has to be high enough in order to assure stability since the output voltage ripple at the voltage feedback node VFB of the controller 120 is divided by the voltage divider. The voltage ripple at the feedback node VFB in turn assures stable PWM operation. This problem encountered in the prior art will be explained hereinafter in detail.

SUMMARY OF THE INVENTION

Therefore, what is desired is a DC/DC converter with improved stability which can use a reduced output voltage ripple and allows use of inexpensive ceramic capacitors. It is an object of the present invention to provide a circuit for DC-to-DC conversion with less output voltage ripple and suitability for using ceramic capacitors as output decoupling capacitor.

In order to achieve the above object, the present invention provides a DC/DC converter, which is used for converting an input voltage to an output voltage. The DC/DC converter comprises a switch, an inductor, a capacitor, a resistor, and a voltage divider. The switch is coupled to the input voltage.

The inductor is used for coupling the first switch to an output node of the DC/DC converter so as to generate the output voltage at the output node. The capacitor is coupled to the output voltage. The resistor is coupled to the capacitor in series, and is coupled to ground. The voltage divider is coupled across the capacitor so as to reduce the zero frequency of the DC/DC converter.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

PRIOR ART

DESCRIPTION OF THE EMBODIMENT

Reference will now be made in detail to the embodiments of the present invention, DC/DC Converter with Improved Stability. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2:
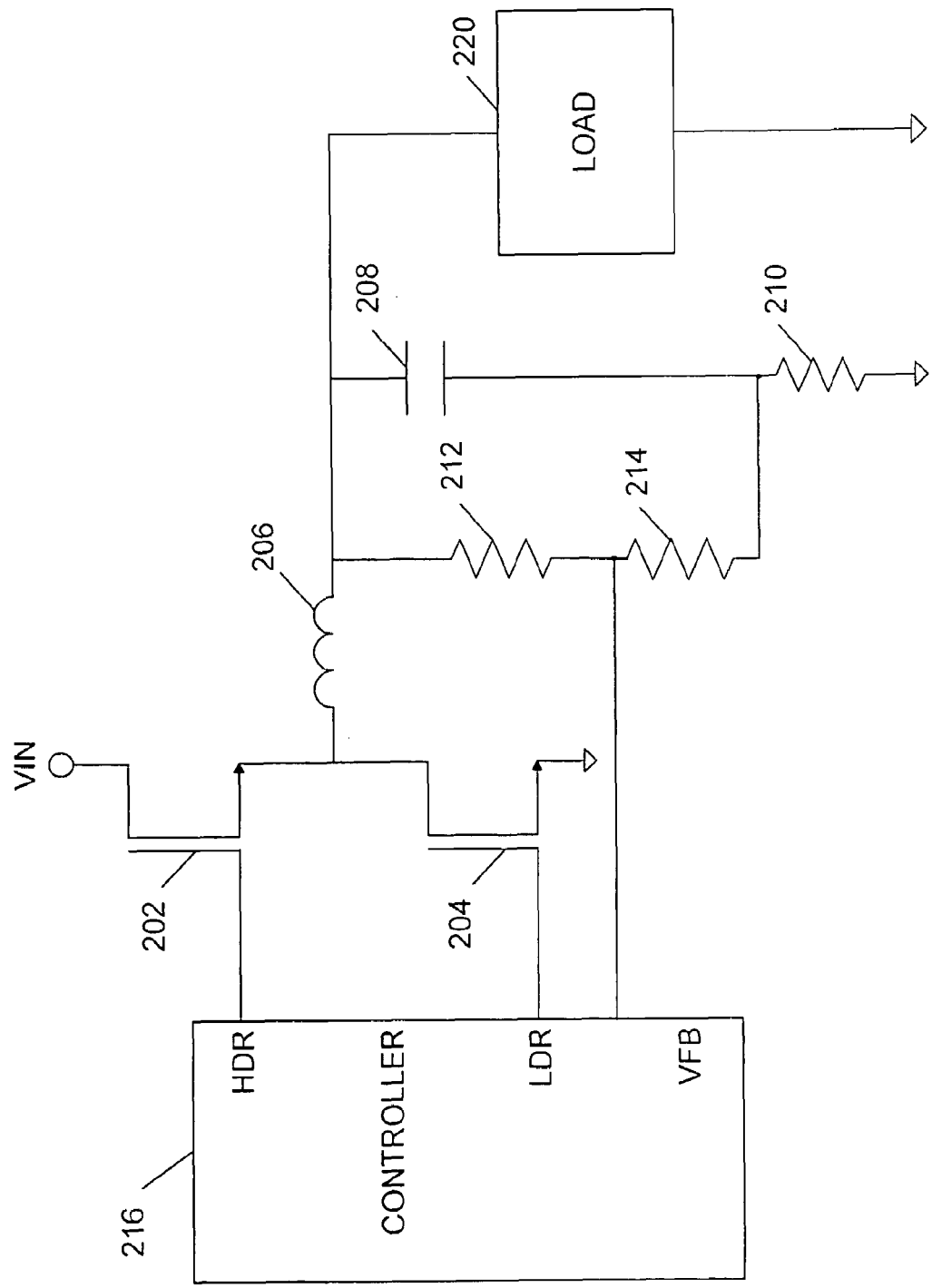
FIG. 2 is a diagram showing a DC/DC converter in accordance with one embodiment of the present invention.

Referring to FIG. 2, a DC/DC converter 200 in accordance with one embodiment of the present invention is illustrated. The DC/DC converter 200 is used to convert an input voltage to a predetermined output voltage on a load 220, and comprises switches 202 and 204, an inductor 206, a capacitor 208, resistors 210, 212 and 214, and a controller 216. The switch 202 couples the input voltage (Vin) of the DC/DC converter 200 to the inductor 206. The switch 204 is coupled to the switch 202 and the inductor 206. The switches, 202 and 204, form a switching circuit for receiving and converting the input voltage to the predetermined output voltage. In accordance with one embodiment of the present invention, the switches 202 and 204 are N-type MOS transistors. It will be apparent to those skilled in the art that the switch 204 can be a diode, in accordance with another embodiment of the present invention. In accordance with further embodiment of the present invention, the switches 202 and 204 are P-type MOS transistors.

One end of the inductor 206 is coupled to the switch 202 and the other is coupled to the output node of the DC/DC converter 200. The capacitor 208 and the resistor 210 are coupled to each other in series for coupling the output node of the DC/DC converter 200 to ground. The inductor 206 and the capacitor 208 form a low pass filter to smooth the output of the DC/DC converter 200.

The resistors 212 and 214 are coupled to each other in series and serve as a voltage divider. The resistors 212 and 214 couple the output node of the DC/DC converter 200 to the resistor 210 across the capacitor 208.

The controller 216 according to one embodiment of the present invention is formed as an integrated circuit (IC) and comprises a HDR pin, a LDR pin and a VFB pin. The HDR pin of the controller 216 is coupled to the switch 202 to control the conductive state of the switch 202 so as to control the output voltage of the DC/DC converter 200. In accordance with one embodiment of the present invention, a PWM signal is delivered from the HDR pin of the controller 216 to regulate the output voltage of the DC/DC converter 200 to the predetermined output voltage. A feedback signal is transmitted from the node between the resistors 212 and 214 to the VFB pin of the controller 216. The controller 216 controls the conductive states of the switches 202 and 204 in response to the feedback signal at the VFB pin.

In accordance with one embodiment of the present invention, that a first PWM signal is used to enable and disenable the switch 202 and a second PWM signal is used to enable and disenable the switch 204. The first and second PWM signals may be the inverse of each other with an overlap disenable short period of time so as to avoid enabling both the switches 202 and 204 at the same time.

Figure 1:
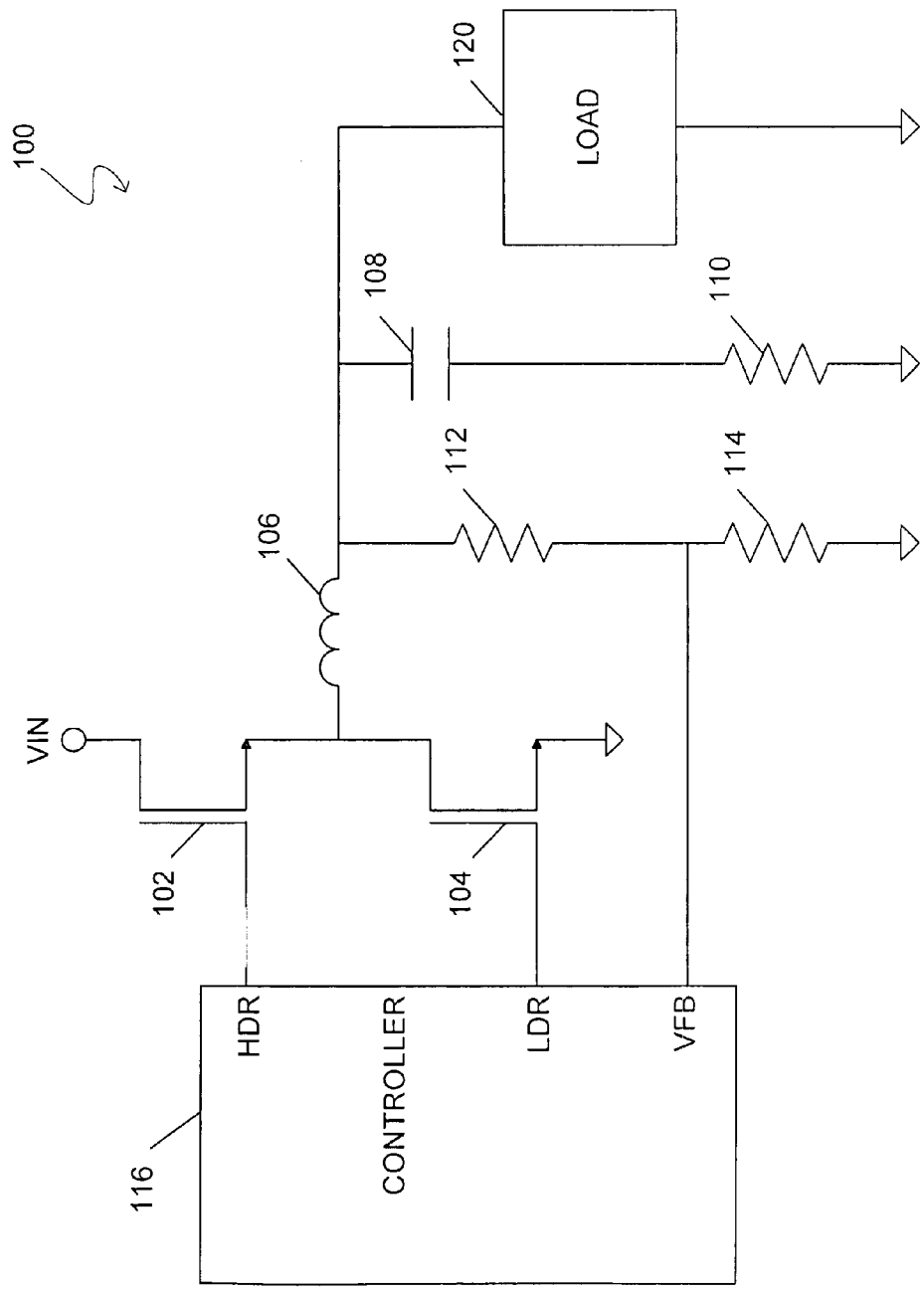
FIG. 1 is a diagram showing a prior art DC/DC converter.

Referring back to FIG. 2, the zero frequency for the DC/DC converter 200 is lower than that for the DC/DC converter 100 shown in PRIOR ART FIG. 1, and depends on the resistor 210, the resistance ratio of resistors 212 and 214 of the voltage divider, and the output capacitor 208. The zero frequency Fz can be calculated in Equation (2) as follows:

$$Fz = \frac{1}{2\pi * Cout * R_{210} * (R_{212} + R_{214})/R_{214}} \quad (2)$$

Where Cout is the capacitance of capacitor 208, and $R_{210}$, $R_{212}$, and $R_{214}$ are the resistances of the resistors 210, 212 and 214, respectively. It will be apparent to those skilled in the art that a desired or a predetermined Fz can be achieved by means of adjusting the resistor 210 or the ratio of resistors 212 and 214. According to an embodiment of the present invention, the ratio of the resistors 212 and 214 are set to meet the requirement of a reference voltage in the controller 216 so as to output a desired output voltage, and the zero frequency Fz is adjusted solely by the resistor 210. Compared with the conventional DC/DC converter shown in PRIOR ART FIG. 1, the resistor 210, which is an additional resistor and is not an ESR of the capacitor 208, can be much lower than the ESR resistor 110 of the capacitor 108 that produces the same ripple on VFB. The capacitor 208 according to the embodiment of the present invention does not need to have a high ESR. An inexpensive ceramic capacitor with high capacitance and low ESR resistance can be used as the output decoupling capacitor 208.

Furthermore, since the output voltage ripple is applied to both sides of the resistor divider, the output voltage ripple is not divided at VFB level. As such, the output ripple voltage that ensures the stability of the converter can be much smaller. It will be apparent to those skilled in the art that, referring back to from FIG. 2, the voltage on the capacitor 208 is divided by the resistors 212 and 214. The voltage ripple developed on resistor 210 is entirely seen in the voltage feedback node VFB and, therefore, the output voltage ripple can be much smaller. Alternatively, when the ripple voltage is not a concern, the capacitance of the capacitor 208 also can be reduced and thus the overall cost can be reduced.

It should be noted that the idea of present invention can be applied to any type of buck DC/DC converter. Furthermore, it may also be applicable to other types of power converters.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A DC/DC converter for converting an input voltage to an output voltage, comprising:
   a first switch coupled to said input voltage;
   an inductor for coupling said first switch to an output node of said DC/DC converter so as to generate said output voltage at said output node;
   a capacitor coupled to said output voltage;
   a first resistor coupled between said capacitor and ground for determining a zero frequency of said DC/DC converter; and
   a voltage divider coupled to said capacitor in parallel and coupled to said first resistor in series and for determining said zero frequency of said DC/DC converter.

2. The DC/DC converter of claim 1, further comprising:
   a controller coupled to said first switch and said voltage divider wherein said voltage divider generates a feedback voltage in response to said output voltage and said controller controls the state of said first switch in response to said feedback voltage.

3. The DC/DC converter of claim 1, wherein said voltage divider comprises:
   a second resistor; and
   a third resistor coupled to said second resistor in series for generating a feedback voltage in response to said output voltage.

4. The DC/DC converter of claim 3, further comprising:
   a controller coupled to said first switch and receiving said feedback voltage so as to control the state of said first switch in response to said feedback voltage.

5. The DC/DC converter of claim 3, wherein said first resistor, said second resistor and said third resistor are coupled in series.

6. The DC/DC converter of claim 1, wherein said capacitor comprises a ceramic capacitor.

7. The DC/DC converter of claim 1, wherein said first switch comprises a MOS transistor.

8. The DC/DC converter of claim 1, further comprising:
   a second switch for coupling said first switch to ground.

9. The DC/DC converter of claim 8, further comprising:
   a controller coupled to said first switch, said second switch, and said voltage divider,
   wherein said voltage divider generates a feedback voltage in response to said output voltage and said controller controls the state of said first switch and the state of said second switch in response to said feedback voltage.

10. The DC/DC converter of claim 9, wherein said controller generates a first PWM signal, and said first PWM signal is transmitted to said first switch for controlling the state of said first switch.

11. The DC/DC converter of claim 10, wherein said controller generates a second PWM signal, and said second PWM signal is transmitted to said second switch for controlling the state of said second switch.

12. The DC/DC converter of claim 8, wherein said second switch comprises a diode.

13. The DC/DC converter of claim 8, wherein said second switch comprises a MOS transistor.

14. A method for controlling a DC/DC converter for converting an input voltage to an output voltage, comprising:
   receiving said input voltage;
   coupling a first switch to said input voltage;
   coupling an inductor to said first switch so as to discontinuously transmit power from said input voltage to said inductor;
   coupling a capacitor to a first resistor in series and to said inductor;
   coupling said first resistor between said capacitor and ground;
   coupling a voltage divider in parallel to said capacitor and in series to said first resistor;
   achieving a specified zero frequency of said DC/DC converter according to said first resistor and said voltage divider;
   generating a feedback voltage signal by said voltage divider; and
   generating a PWM signal to discontinuously enable said first switch so as to discontinuously transmit power from said input voltage to said inductor.

15. The method as claimed in claim 14, wherein said generating said PWM signal further comprises:
   generating said PWM signal in response to said feedback voltage signal.

16. The method as claimed in claim 14, wherein said capacitor comprises a ceramic capacitor.

17. The method as claimed in claim 14, wherein said generating said feedback voltage signal further comprises:
   coupling a second resistor and a third resistor in series so as to form a voltage divider; and coupling said voltage divider across said capacitor.

18. The method as claimed in claim 17, further comprising:
   coupling said first resistor, said second resistor and said third resistor in series.

19. The method as claimed in claim 14, further comprising:
   coupling a second switch to said first switch for coupling said first switch to ground; and
   generating a second PWM signal to discontinuously enable said second switch.

* * * * *